United States Patent [19]

Kistler

[11] 4,454,770

[45] Jun. 19, 1984

[54] TORQUE-INSENSITIVE LOAD CELL

[75] Inventor: Walter P. Kistler, King County, Wash.

[73] Assignee: Kistler-Morse Corporation, Bellevue, Wash.

[21] Appl. No.: 334,252

[22] Filed: Dec. 24, 1981

[51] Int. Cl.³ .............................................. G01L 1/22
[52] U.S. Cl. ................................. 73/862.65; 177/211; 177/229; 338/5
[58] Field of Search ............................ 177/211, 229; 73/862.65; 338/2, 5

[56] References Cited

U.S. PATENT DOCUMENTS

| 2,859,613 | 11/1958 | Green | 177/211 X |
| 2,866,059 | 12/1958 | Laimins | 177/211 X |
| 3,161,046 | 12/1964 | Farley | 73/862.65 |
| 3,805,604 | 4/1974 | Ormond | 73/862.65 X |
| 3,927,560 | 12/1975 | Farr | 177/211 X |
| 4,219,089 | 8/1980 | Gard | 177/128 X |

OTHER PUBLICATIONS

Modern Strain Gage Transducers . . . Their Design and Construction; Epsilonics, vol. 2, No. 2, Jul. 1982, pp. 6–8.

Primary Examiner—Joseph W. Hartary

Attorney, Agent, or Firm—Seed and Berry

[57] ABSTRACT

A load cell having a parallelogram configuration formed by a pair of spaced-apart, generally parallel force-receiving members interconnected by a cantilever beam and a parallel spacer beam. The cantilever beam projects perpendicularly from one of the force-receiving members, and its end is secured to the other beam by a flexure hinge. The ends of the spacer beam are secured to the force-receiving members by respective flexure hinges. In order to maintain the parallelogram configuration of the load cell, the length of the spacer beam is equal to the length of the cantilever beam from the beam's virtual pivot point to its end. Rotational moments imparted to the force-receiving members apply forces to the beams along their longitudinal axes without deflecting the cantilever beam, thus making the load cell insensitive to such moments. A reduced thickness portion instrumented with semiconductor strain gauges is formed in the cantilever beam near its point of attachment with the force-receiving member. The reduced thickness portion accurately positions the virtual pivot point of the beam and it concentrates the stress at the strain gauges. The load cell may be used in a scale by securing one of the load-receiving members on a base and mounting a load-receiving tray on the other load-receiving member.

12 Claims, 5 Drawing Figures

TORQUE-INSENSITIVE LOAD CELL

TECHNICAL FIELD

This invention relates to sensing forces and weights, and, more particularly, to a torque-insensitive load cell having a parallelogram configuration formed in part by a cantilever beam instrumented with strain gauges.

BACKGROUND ART

Load cells have long been used to measure forces and loads. Such load cells generally utilize a resilient structure which is tensioned, compressed, or bent by a force applied to the structure. Strain-sensing devices, such as wire or semiconductor strain gauges, are mounted to measure the force-induced tension, compression, or bending.

In many applications, it is important that the load cell respond to some types of forces but be insensitive to other types of forces. For example, a load cell used to support a weighing tray should respond to objects placed on the tray, but it should be insensitive to the position of the objects on the tray. In other words, the load cell should respond to the downward force exerted on the load cell by the object, but it should be insensitive to moments generated by the weight of the object.

Load cells utilizing a cantilever beam have sometimes been used to weigh objects. In a cantilever beam load cell, a beam projects generally perpendicularly from a support, and a load is carried by the beam so that it deflects in proportion to the weight of the load. A strain-sensing device is mounted on the beam, usually on the upper and lower surfaces, to provide an electrical indication of the load. The principal disadvantage of cantilever beam load cells is the difficulty of coupling a load to the beam without also transmitting load-induced moments to the beam. This difficulty is usually overcome by either hanging the load from the cantilever beam or supporting the load on a knife edge mounted on the beam so that the load is incapable of transmitting moments to the beam.

Another technique for overcoming the difficulty encountered by loading cantilever beams is to provide a stabilizing structure which resists moments but is highly compliant to linear forces. The stablizing structure thus constrains a force-transmitting member to move in a single direction so that it can deflect the cantilever beam, but, since it is incapable of rotating, it cannot apply a moment to the beam.

One commonly used load cell utilizes a pair of strain gauge instrumented parallel beams. Basically, the parallelogram load cell includes a pair of parallel, spaced-apart load-receiving members which are interconnected by parallel beams. Moments applied to the force-receiving members are translated into forces applied to the beams along their longitudinal axes. Although the beams do, in fact, elongate and contract in response to these moments, strain-sensing devices mounted on the upper and lower surfaces of the beams are connected differentially so that the strain gauges respond to bending but not elongation and compression.

Parallelogram load cells of this type are quite similar to cantilever load cells, but, in fact, they are not in actuality cantilever beams. In a cantilever beam, the beam deflects in a single curve from a horizontal angle at the support to either an upward or downward angle at its end. The beams of conventional parallelogram load cells have ends with intersect their respective supports at ninety degrees, thus forcing the beam to bend in a compound S-shaped curved. A curvature of this type requires a relatively large number of strain-sensing devices and it is thus more expensive to manufacture.

DISCLOSURE OF THE INVENTION

It is an object of the invention to provide a load cell which is capable of responding to forces imparted an object carried by the load cell without responding to moments imparted to the load cell by the object.

It is another object of the invention to provide a load cell of the character described which may be mounted in a wide variety of configurations.

It is still another object of the invention to provide a load cell having a parallelogram structure which utilizes a true cantilever beam as the stress-responsive element.

It is a further object of the invention to provide a technique for adjusting the position of the virtual pivot point of a cantilever beam in a parallelogram load cell to minimize the sensitivity of the load cell to moments.

These and other objects of the invention are provided by a load cell having first and second spaced-apart force-receiving members. A first beam extending between the force-receiving members has one end connected to the first member in cantilever fashion so that the angle between the first member and the beam is substantially constant. The other end of the beam is connected to the second force-receiving member through a flexure hinge which is capable of transmitting longitudinal forces to the beam while allowing the beam to easily pivot with respect to the second member. A spacer beam, extending between the first and second force-receiving members, has its ends connected thereto by respective flexure hinges which, like the flexure hinge of the cantilever beam, are capable of transmitting forces to the beam while allowing the ends of the beam to freely pivot with respect to the force-receiving members to which they are secured. In order to maintain the parallelogram configuration of the load cell, the length of the spacer beam is equal to the length of the cantilever beam from its virtual pivot point to the flexure hinge which connects it to the second force-receiving member. Strain-sensing means are mounted on the cantilever beam, preferably near its point of attachment to the first force-receiving member, for providing an electrical indication of the flexing of the beam caused by a force applied between the first and second force-receiving members. The strain-sensing means is preferably mounted on a portion of the cantilever beam having a reduced cross-sectional area in order to concentrate the bending strain at the point of measurement and to accurately position the virtual pivot point of the beam. The position of the virtual pivot point can be further adjusted by removing material from the sides of the beam, thereby more precisely providing a parallelogram shape in order to minimize the sensitivity of the load cell to moments. The load cell is preferably formed from a single piece of resilient material, with the flexure hinges being formed by respective pairs of parallel cylindrical bores positioned closely adjacent each other to form a relatively thin web.

BEST MODE FOR CARRYING OUT THE INVENTION

Figure 1:
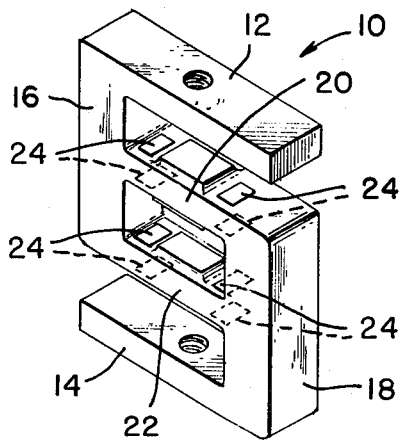
FIG. 1 is an isometric view of a prior art load cell having a parallelogram configuration.

A conventional load cell of a parallelogram configuration is illustrated in FIG. 1. The load cell 10 utilizes a pair of base members 12,14 integrally formed with respective force-transmitting members 16,18. The force-transmitting members 16,18 are interconnected by a pair of beams 20,22. Conventional strain gauges 24 of either the wire or semiconductor variety are mounted on the beams 20,22 near their points of attachment to the force-transmitting members 16,18. A compressive force applied to the bases 12,14 causes the beams 20,22 to deflect in a generally S-shaped configuration so that the strain gauges 24 on the upper lefthand surface and lower righthand surface sense tension, while the strain gauges 24 on the lower lefthand surface and upper righthand surface of each beam 20,22 sense compression. It will be noted that each beam 20,22 requires the use of four strain gauges, which results in a significant cost. It will also be noted that the beams 20,22 are not, in actuality, cantilever beams since their deflection characteristics are not that of a cantilever beam. A cantilever beam deflects in a single curve, whereas the beams 20,22 deflect in a complex S-shaped curve.

The beams 20,22, being parallel and of equal length, form a parallelogram with the intervening portions of the force-transmitting members 16,18. As a result, moments applied to the bases 12,14 are transformed into forces acting on the beams 20,22 along their longitudinal axes. For example, a moment M applied to the base 12 compresses the beam 20 while tensioning the beam 22. Although the beams 20,22 will, in fact, contract and elongate, respectively, in response to this moment, the strain gauges 24 are differentially connected so that strain gauges on opposite surfaces, and thus undergoing the same strain, do not produce an electrical output.

Figure 2:
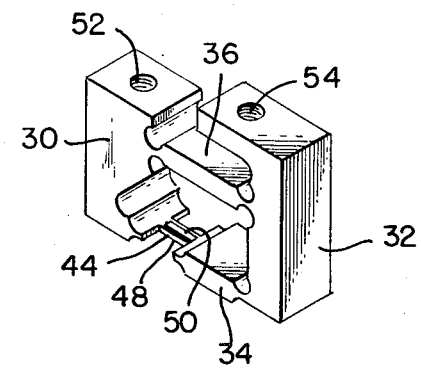
FIG. 2 is an isometric view of the inventive load cell.
Figure 3:
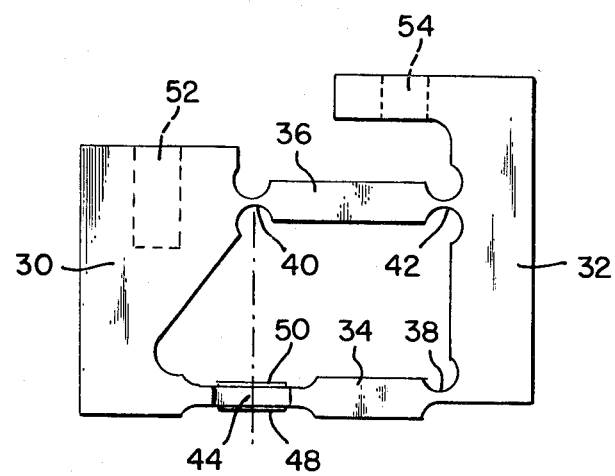
FIG. 3 is a side elevational view of the inventive load cell.
Figure 4:
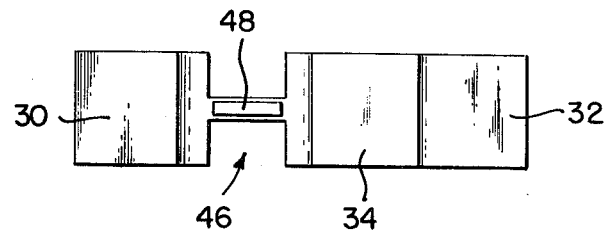
FIG. 4 is a top plan view of the load cell.

The inventive load cell, as illustrated in FIGS. 2-4, utilizes a pair of bases 30,32 which are adapted to receive loads or forces generally acting along their longitudinal axes. The bases 30,32 are connected to each other by a cantilever beam 34 and by a spacer beam 36 which is parallel to the cantilever beam 34. The cantilever beam 34 is connected to the base 30 in true cantilever fashion so that its angle with respect to the base 30 at the point of attachment thereto remains substantially constant. However, the opposite end of the cantilever beam 34 is connected to the base 32 through a flexure hinge 38. The flexure hinge 38 is capable of transmitting longitudinal and transverse forces to the cantilever beam 34, but it is highly compliant in the pivotal mode so that the angle between the beam 34 and the base 32 at the end of the beam 34 can vary in true cantilever fashion.

The ends of the spacer beam 36 are connected to the bases 30,32 by respective flexure hinges 40,42 which, like the flexure hinge 38 connecting the cantilever beam 34 to the base 32, are capable of transmitting longitudinal and transverse forces to the beam 36 while allowing the beam 36 to freely pivot with respect to the bases 30,32. It will be understood, however, that second cantilever beam may be used in place of the spacer beam 36.

In order to maintain the parallelogram configuration of the load cell, it is important that the length of the spacer beam 36 be substantially equal to the length of the cantilever beam from its virtual pivot point 44 to the end of the beam 34 that is connected to the base 32 through the hinge 38. The virtual pivot point is the point in a beam about which the end of the beam revolves. In the embodiment illustrated in FIGS. 2-4, the virtual pivot point 34 is in vertical alignment with the hinge 40. However, it will be understood that this vertical alignment is not necessary as long as the length of the spacer beam 36 is equal to the length of the cantilever beam 34 from the virtual pivot point 44 to the hinge 38.

The virtual pivot point of a uniform cantilever beam is normally at its center for small deflections of the beam. For larger deflections, the virtual pivot point moves toward the point of attachment with the support. The virtual pivot point may be moved, however, by utilizing a nonuniform beam. As best illustrated in FIGS. 2 and 4, the cantilever beam 34 has a gauging area 46 formed by a portion having a reduced cross-sectional area. The gauging area 46 of reduced cross-sectional area produces two desirable results. First, it accurately locates the virtual pivot point 44 at the center of the gauging area. Second, it concentrates the strain of the beam 34 responsive to loading at the gauging area. This is important because a pair of strain gauges 48,50, preferably of the conventional semiconductor variety, are mounted on the upper and lower surfaces of the gauging area 46. As a result of this configuration, the electrical output of the load cell is relatively large for a given deflection.

As mentioned above, the beams 34,36, in combination with the bases 30,32, form a parallelogram structure in order to minimize the sensitivity of the load cell to moments applied to the bases 30,32. However, in practice, it is extremely difficult to insure that the length of the spacer beam 36 is exactly equal to the length of the cantilever beam 34 from the virtual pivot point 44 to the hinge 38. The position of the virtual pivot point 44 may be adjusted, however, to more closely approximate a parallel configuration and thus minimize sensitivity to moments. Accordingly, the virtual pivot point 44 may be moved upwardly or downwardly by removing material from the cantilever beam 34 from either its upper or lower surface, respectively. Moving the virtual pivot point 44 upwardly or downwardly affects the sensitivity of the load cell to moments applied about an axis perpendicular to the longitudinal axis of the beam 34. In a similar manner, the virtual pivot point 44 may be moved transversely by removing material from opposite sides of the beam 34. Moving the virtual pivot point 44 from side to side affects the sensitivity of the load cell to moments applied about an axis parallel to the longitudinal axis of the beam 34.

The load cell is preferably formed from a single piece of resilient material which has been machined to form the cantilever beam 34, spacer beam 36, and bases 30,32. The flexure hinges 38,40,42 may be formed by boring a pair of parallel holes closely spaced from each other to form flexible webs. Threaded bores 52,54 are then formed in the bases 30,32, respectively, to mount the load cell to force-transmitting structures, such as the scale 60 illustrated in FIG. 5. The scale 60 includes a box-like enclosure 62 having a bottom 64, sidewalls 66, and a top 68. The top 68 contains a cutout 70 through which the base 32 projects when the base 30 is secured to the underside of the top 68 by screw 72. A load-receiving tray 74 is mounted on the portion of the base 32 projecting through the cutout 30 and is secured thereto by a screw 76. Objects placed on the tray 74 thus deflect the cantilever beam 34, while the spacer beam 36 maintains the parallelogram configuration of the load cell. The load cell is thus insensitive to the position of objects on the tray 74 which apply rotational moments to the base 32.

The strain gauges 48,50 mounted on the cantilever beam 34 are connected to a terminal board 80 which is fastened to the base 30. Conductors on the terminal board 80 connect the strain gauges 48,50 to circuitry 82 on a printed circuit board 84 through leads 86. The circuitry 82 is of conventional variety and basically includes a wheatstone bridge which is formed, in part, by the strain gauges 48,50. The output of the wheatstone bridge is applied to an amplifier which generates an output having a magnitude indicative of the load placed on the tray 74. The amplifier may thus be connected to a conventional analog voltage indicating device. Alternatively, the output may be connected to an analog-to-digital convertor having its output, in turn, connected to a conventional digital display 88.

Figure 5:
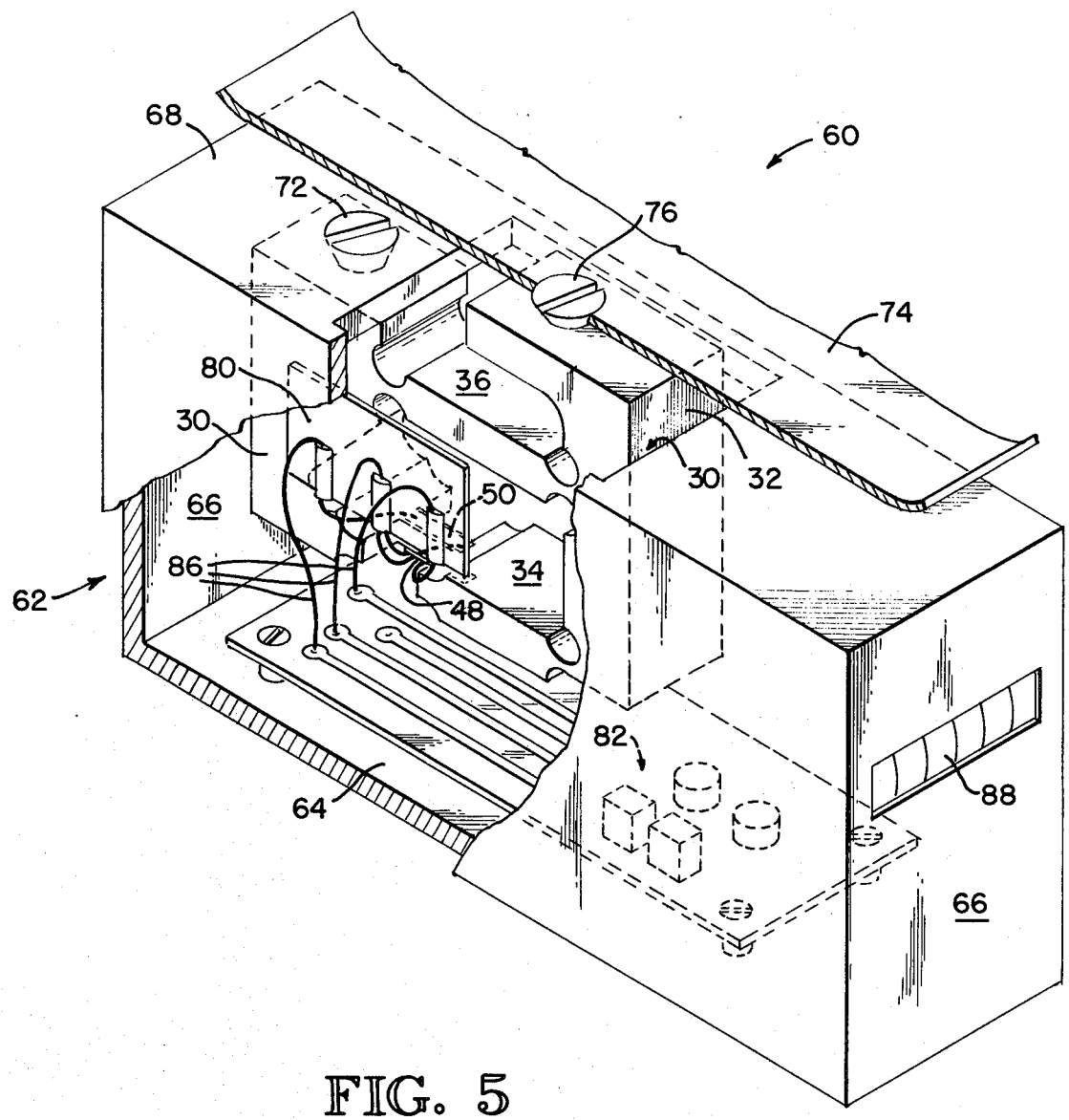
FIG. 5 is a broken isometric view of a weighing scale utilizing the inventive load cell.

Although the load cell illustrated herein is adapted for mounting as illustrated in FIG. 5, it will be understood that the configuration of the bases 30,32 is unimportant. Thus, for example, the bases 30,32 could be mounted to objects on opposite sides, and they may be mounted utilizing a variety of structures.

The inventive load cell is thus highly accurate, relatively inexpensive, and virtually insensitive to applied moments. Furthermore, it may be easily modified for use in a wide variety of applications.

I claim:

1. A torque-insensitive load cell, comprising:
   first and second spaced-apart force-receiving members;
   a cantilever beam extending between said first and second force-receiving members, one end of said beam being connected to said first member in cantilever fashion so that the angle between said first member and said beam at the area of attachment therebetween is substantially constant, the other end of the said beam being connected to said second member through a relatively thin flexure hinge which is capable of transmitting forces to said beam while allowing said beam to freely pivot with respect to said second member;
   a second beam extending between said first and second force-receiving members and having at least one of its ends connected to a respective force-receiving member by a flexure hinge which is capable of transmitting forces to said beam while allowing said beam to freely pivot with respect to said first and second members, said second beam having an effective length which is equal to the length of said first beam from its virtual pivot point to the flexure hinge connecting the end of said beam to said second member, said first and second force-receiving members being spaced apart solely by said cantilever beam and said spacer beam so that the longitudinal stress on said cantilever beam is unaffected by variations in the relative lengths of said cantilever beam and said spacer beam;
   strain-sensing means mounted on said cantilever beam for providing an electrical indication of the flexing of said beam; and
   means for applying a force between said first and second force-receiving members having a component which is perpendicular to said beams, thereby flexing said cantilever beam and causing said strain-sensing means to generate an electrical indication of the force applied between said force-receiving members.

2. The load cell of claim 1 wherein said second beam is a spacer beam having each of its ends connected to respective force-receiving members by flexure hinges.

3. The load cell of claim 2, further including a gauging area formed on said cantilever beam on which said strain-sensing means is mounted, said gauging area having a reduced cross-sectional area, thereby fixing the position of the virtual pivot point of said beam and concentrating the flex of said beam at said strain-sensing means.

4. The load cell of claim 3 wherein said gauging area is located closely adjacent the junction of said cantilever beam with said force-receiving member.

5. The load cell of claim 2 wherein said force-receiving members and said beams are integrally formed from a single piece of resilient material.

6. The load cell of claim 2 wherein said flexure hinges are formed by respective pairs of parallel cylindrical bores formed closely adjacent the juncture between said beams and force-receiving members, said bores being spaced apart from each other by a relatively small distance to form a relatively thin web therebetween which is highly compliant about an axis parallel to the said bores.

7. The load cell of claim 2 wherein said strain-sensing means are a pair of semiconductor strain gauges mounted on opposite surfaces of said cantilever beam from the neutral bending axis of said beam.

8. The load cell of claim 2 wherein said gauging area is located closely adjacent the juncture of said cantilever beam with said force-receiving member.

9. The load cell of claim 2, further including a base to which one of said force-receiving members is secured, a load-receiving tray mounted on the other of said force-receiving members, a bridge circuit formed at least in part by said strain-sensing means, amplifier means receiving the output of said bridge circuit, and indicator means for providing a visual indication of the magnitude of the output of said amplifier means whereby said indicator means provides an indication of the load carried by said tray.

10. A method of fabricating a load cell, comprising:
    providing first and second spaced-apart force-receiving members;
    providing a cantilever beam extending between said first and second force-receiving members, one end of said beam being connected to said first member in cantilever fashion so that the angle between said first member and said beam at the area of attachment therebetween is substantially constant, the other end of said beam being connected to said second member through a relatively thin flexure hinge which is capable of transmitting forces to said beam while allowing said beam to freely pivot with respect to said second member;
    providing a spacer beam extending between said first and second force-receiving members and having at least one of its ends connected thereto by a flexure hinge which is capable of transmitting forces to said beam while allowing said beam to freely pivot with respect to said first and second members, said second beam having an effective length which is equal to the length of said cantilever beam from its virtual pivot point to the flexure hinge connecting the end of said beam to said second member, said first and second force-receiving members being spaced apart solely by said cantilever beam and said second beam so that the longitudinal stress on said cantilever beam is unaffected by variations in the relative lengths of said cantilever beam and said second beam;

providing strain-sensing means mounted on said beam for generating an electrical indication of the flexing of said cantilever beam; and removing material from said cantilever beam to modify the virtual pivot point of said beam so that said load cell is insensitive to rotational moments applied between said first and second members.

11. The method of claim 10 wherein said material is removed on one side or the other of the neutral bending axis of said beam to minimize the sensitivity of said load cell to moments applied to said members about an axis parallel to the pivot axis of said virtual pivot point.

12. The method of claim 10 wherein said material is removed from one or the other lateral surface of said beam to minimize the sensitivity of said load cell to moments applied to said members about an axis parallel to the longitudinal axis of said beam.

* * * * *